(12) United States Patent
Bentkovski

(10) Patent No.: US 11,603,239 B2
(45) Date of Patent: Mar. 14, 2023

(54) DEVICE FOR REMINDING AND MEASURING MATERIAL LEVEL INSIDE A MATERIAL CONTAINER

(71) Applicant: WATERIO LTD., Ness Ziona (IL)

(72) Inventor: Yakov Bentkovski, Ness Ziona (IL)

(73) Assignee: IMPACX.IO LTD, Rehovot (IL)

( * ) Notice: Subject to any disclaimer, the term of this patent is extended or adjusted under 35 U.S.C. 154(b) by 0 days.

(21) Appl. No.: 16/872,037

(22) Filed: May 11, 2020

(65) Prior Publication Data

US 2021/0094735 A1 Apr. 1, 2021

Related U.S. Application Data

(63) Continuation of application No. 14/972,870, filed on Dec. 17, 2015, now Pat. No. 10,647,484.

(60) Provisional application No. 62/093,411, filed on Dec. 18, 2014.

(51) Int. Cl.
*B65D 51/24* (2006.01)
*G01F 23/26* (2022.01)
*G01F 23/296* (2022.01)
*G01F 23/292* (2006.01)

(52) U.S. Cl.
CPC ............ *B65D 51/248* (2013.01); *G01F 23/26* (2013.01); *G01F 23/292* (2013.01); *G01F 23/296* (2013.01)

(58) Field of Classification Search
CPC ....... B65D 51/248; B65D 43/00; G01F 23/26; G01F 23/296; G01F 23/292; G01F 23/00; G01F 23/22

USPC .......................................................... 340/604
See application file for complete search history.

(56) References Cited

U.S. PATENT DOCUMENTS

| | | | |
|---|---|---|---|
| 5,842,347 A | 12/1998 | Kinder | |
| 6,498,566 B1 * | 12/2002 | Lin | G01F 23/26 |
| | | | 73/304 C |
| 7,017,807 B2 | 3/2006 | Kipp et al. | |
| 8,091,579 B2 | 1/2012 | Sintes et al. | |
| D718,626 S | 12/2014 | Lane | |
| 8,907,796 B2 | 12/2014 | Sweeney et al. | |
| 9,151,605 B1 | 10/2015 | Sweeney et al. | |
| 2007/0222619 A1 | 9/2007 | Moran | |
| 2009/0139324 A1 | 6/2009 | Morimoto et al. | |
| 2010/0101317 A1 | 4/2010 | Ashrafzadeh et al. | |

(Continued)

FOREIGN PATENT DOCUMENTS

| | | |
|---|---|---|
| CN | 2563556 Y | 7/2003 |
| CN | 1688498 | 10/2005 |

(Continued)

*Primary Examiner* — Hirdepal Singh
(74) *Attorney, Agent, or Firm* — Pearl Cohen Zedek Latzer Baratz LLP

(57) ABSTRACT

A device to measure the material level inside the container includes a housing unit removably attachable to a cap of a container for holding a beverage, wherein the housing unit is configured to remain attached to the cap when the cap is at least partially removed from the container. The device further includes, a signal producing unit located in the housing unit, a first sensor located in the housing unit to sense a beverage level in the container and a controller located in the housing unit. The controller is configured to receive from the first sensor an indication of a beverage level in the container and activate the signal producing unit based at least on the indication of the beverage level in the container.

9 Claims, 4 Drawing Sheets

(56) References Cited

U.S. PATENT DOCUMENTS

| | | |
|---|---|---|
| 2010/0163567 A1 | 7/2010 | Chang et al. |
| 2014/0251850 A1 | 9/2014 | Huang et al. |
| 2014/0319170 A1 | 10/2014 | Sweeney et al. |
| 2014/0367291 A1* | 12/2014 | Lopez .................... A47G 23/16 206/459.1 |
| 2015/0257981 A1* | 9/2015 | Arad .................... A61J 7/0436 340/573.1 |
| 2015/0285775 A1 | 10/2015 | Gurumohan et al. |
| 2015/0355012 A1 | 12/2015 | Gurumohan et al. |
| 2016/0025545 A1* | 1/2016 | Saltzgiver ........... G01F 23/2962 73/304 C |
| 2016/0048657 A1* | 2/2016 | LeBrun ................ G16H 40/67 705/2 |
| 2016/0120758 A1 | 5/2016 | Pi et al. |
| 2016/0198246 A1* | 7/2016 | Gurumohan ........... G08C 17/02 340/870.02 |
| 2016/0297583 A1 | 10/2016 | Staeben et al. |
| 2016/0327427 A1 | 11/2016 | Briones et al. |

FOREIGN PATENT DOCUMENTS

| | | |
|---|---|---|
| CN | 101726343 A | 6/2010 |
| CN | 203461375 | 3/2014 |
| CN | 204306687 U | 5/2015 |
| JP | S63162471 | 7/1988 |
| JP | 2003534209 A | 11/2003 |
| JP | 2006225020 | 8/2006 |
| JP | 2011057239 | 3/2011 |
| JP | 2014033962 | 2/2014 |
| RU | 2065393 C1 | 8/1996 |
| RU | 2148546 C1 | 5/2000 |
| WO | WO 2001/010732 A1 | 2/2001 |
| WO | WO 2001/089950 A2 | 11/2001 |
| WO | WO 2004/022456 A2 | 3/2004 |
| WO | WO 2015/187545 | 12/2015 |

\* cited by examiner

DEVICE FOR REMINDING AND MEASURING MATERIAL LEVEL INSIDE A MATERIAL CONTAINER

CROSS-REFERENCE TO RELATED APPLICATIONS

This application is a continuation of U.S. patent application Ser. No. 14/972,870, filed Dec. 17, 2015, which claims the benefit of U.S. Patent Provisional Application No. 62/093,411, filed Dec. 18, 2014, which is hereby incorporated by reference in its entirety.

FIELD OF THE INVENTION

The present invention generally relates to a measurement and reminder communication system attached with a material container, and more specifically relates to a measurement and reminder communication system attached with a material container to communicate data to a computing device of a user through a communication network.

BACKGROUND OF THE INVENTION

Water or fluid is crucial to the human being. Every system in the body depends on water or fluid. The human body made up of between 55 and 75 percent water, is in need of timely water replenishment. Lack of water can lead to dehydration, a condition that occurs when someone does not have enough water in his/her body to carry on normal functions. Even mild dehydration—as little as a 1 percent to 2 percent loss of the body weight—can exhaust the energy and make the person tired.

Dehydration poses a particular health risk for the very young and the very old. Signs and symptoms of dehydration includes but not limited to excessive thirst, fatigue, headache, dry mouth, little or no urination, muscle weakness, dizziness etc. People seem to carry bottled water everywhere they go. Health practitioners all over the world suggest drinking of eight glasses water a day.

There are plenty of other reasons to drink water. The major reasons for drinking water includes maintaining the balance of body materials, controlling calories, energizing muscles, maintaining skin quality, and helping kidneys. People of different ages, gender and weight may require drinking different amount of water per day according to various factors such as locale profile, country and climate profile.

Various apparatus are known for containing various materials such as liquid, powder, tablets etc. Such apparatus generally uses scale marks method to measure the material level. However, such methods are time consuming and do not accurately measures the material level. Further, such apparatus fails to provide reminding signals based on the material consumption.

Therefore, there is a need of a device for reminding and measuring material level inside a material container using sensors. Further, the device communicates the material used by a user to a computing device.

SUMMARY OF THE INVENTION

In accordance with teachings of the present invention, there is provided a device to measure the level of a beverage or liquid in a container.

Some embodiments of the present invention are directed to providing the device with a cap comprising an indent configured to receive a fitting element, such as a neck or nozzle, wherein the indent is aligned parallel to the neck or nozzle; a printed circuit board attached to the cap of the container; a first sensor placed in between the printed circuit board and the indent of the cap, the first sensor measuring the level inside the container, where the first sensor is to generate a sensing signal based on the measurement of material level; and a battery placed on the printed circuit board.

In some embodiments, the device includes a battery holder attached to the housing for holding the battery on the printed circuit board, and a controller connected to the printed circuit board for releasing reminding signals based on the analysis of the sensed signals. The controller wirelessly communicates with the computing device. The battery holder may be configured to hold a battery, and be electrically connected to power the controller when a batter is suitably placed inside the battery housing.

In some embodiments, the device includes an output unit for generating output signals upon receiving reminding signals from the controller, a wireless communication unit for wirelessly communicating with the computing device and a housing unit connected to the cap of the container for housing the components of the device.

In some embodiments, the first sensor includes at least one of: an optical sensor; capacitive sensor; and ultrasonic sensor. The output unit includes at least one of an audio unit connected to the printed circuit board to generate audio signals on receiving reminder signals from the controller, one or more light emitting sources connected to the printed circuit board to illuminate on receiving reminder signals from the controller, and a vibration unit connected to the printed circuit board to produce vibration signals on receiving reminder signals from the controller.

Some embodiments of the present invention include a wireless communication unit including, for example, at least one of a wireless transceiver and a wireless transmitter. Some embodiments of the invention may further provide a second sensor to detect detaching and attaching of the cap from the container, where the second sensor releases the sensed signal to the controller.

Some embodiments of the invention are directed to a device that includes a housing unit removably attachable to a cap of a container for holding a beverage, wherein the housing unit is configured to remain attached to the cap when the cap is at least partially removed from the container. In some embodiments, the device further includes, a signal producing unit located in the housing unit, a first sensor located in the housing unit to sense a beverage level in the container and a controller located in the housing unit. In some embodiments, the controller is configured to receive from the first sensor an indication of a beverage level in the container and activate the signal producing unit based at least on the indication of the beverage level in the container.

In some embodiments, the housing unit is further shaped to be fittable over a cap of the container. In some embodiments, the housing unit is configured to be snapped shut over the cap of the container. In some embodiments, the first sensor is selected from the group consisting of: an optical sensor, a capacitive sensor, and an ultrasonic sensor. In some embodiments, the signal producing unit is selected from a group consisting of In some embodiments, the device further includes a bottom cover attached to the housing unit, wherein the signal producing unit, the first sensor and the controller are placed between the housing unit and the bottom cover. In some embodiments, the bottom cover includes an indented portion, wherein the indented portion is configured to be aligned with a nozzle of the cap when the housing unit is closed over the cap of the container.

In some embodiments, the device further includes a printed circuit board placed in the housing unit, wherein at least the controller and the signal producing unit are mounted on the printed circuit board. In some embodiments, the device further includes a communication unit associated with the controller, wherein the controller is further configured to communicate with a user device via the communication unit. In some embodiments, the device further includes a battery held by a battery holder.

In some embodiments, the device further includes a second sensor located in the housing unit to sense closing and opening of the housing unit over the cap of the container. In some embodiments, the device further includes a third sensor located in the housing unit to sense an environmental condition. In some embodiments, the controller is further configured to receive from the third sensor an indication of an environmental condition and to change the activation of the signal producing unit based at least on the indication of the environmental condition.

These and other features and advantages will become apparent from the following detailed description of illustrative embodiments thereof, which is to be read in connection with the accompanying drawings.

Figure 1:
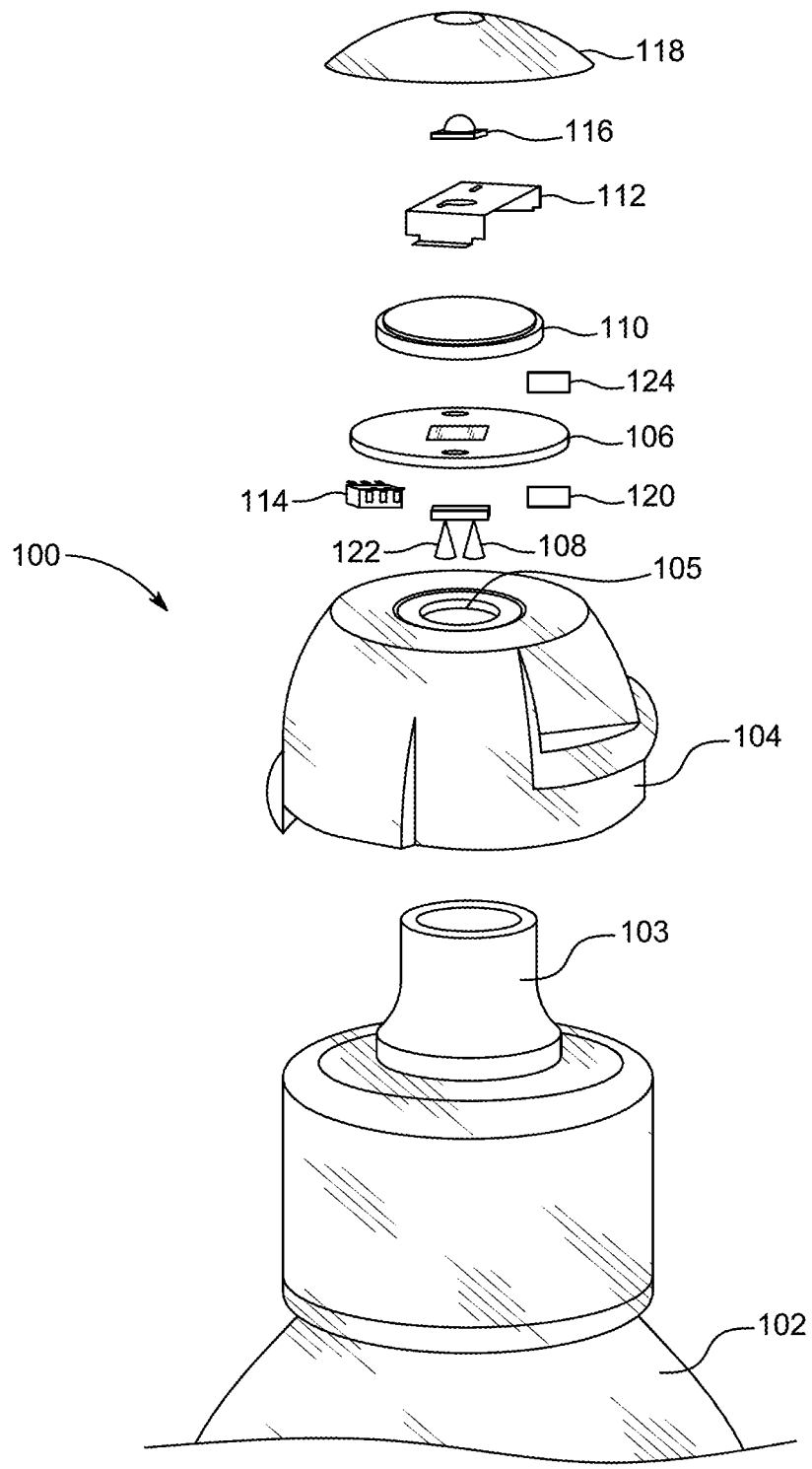
FIG. 1 illustrates an exploded view of a device attached to a container for measuring material level in accordance with some embodiments of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

While this technology is illustrated and described in a particular embodiment, it will be understood that a device for measuring material level may be produced in different sizes, shapes and colors. This is depicted in the drawings, and will herein be described in detail, as an exemplary embodiment of the invention, with the understanding that the present disclosure is to be considered as an illustration of the principles of the invention and the associated functional specifications for its construction and is not intended to limit the invention to the embodiment illustrated. Those skilled in the art will envision many other possible variations within the scope of the technology described herein.

FIG. 1 illustrates an exploded view of in-cap device 100 for measuring material level inside a container 102 in accordance with some embodiments of the present invention. The device 100 communicates with a computing device. The container 102 includes a neck 103 for receiving material. In a preferred embodiment, the neck 103 is a spout. Example of material includes but not limited to water, juices, powder such as coffee, nutrient supplements etc.

The in-cap device 100 may include a cap 104, printed circuit board 106, a first sensor 108, a battery 110, a battery holder 112, a controller 114, an output unit 116, and a housing unit 118. The cap 104 is configured to receive the neck 103 of the container 102. The cap 104 includes an indent 105 for allowing the sensors to measure the material level inside the container 102.

The printed circuit board 106 is attached to the top of the cap 104 of the container 102. The first sensor 108 is placed in between the printed circuit board 106 and the indent 105 of the cap 104. The first sensor 108 measures the material level inside of the container 102 through the neck 103 of the container 102. Examples of the first sensor 108 includes but not limited to optical sensor, capacitive sensor and sonic/ultrasonic sensor.

The battery 110 is placed on the printed circuit board 106. Examples of battery 110 include but not limited to a lithium cell battery. The battery holder 112 holds the battery 110 on the printed circuit board 106. The shape and size of the battery holder 112 is configured according to the size of the battery 110.

The controller 114 is connected to the printed circuit board 106 for generating reminding signals based on the analysis of the sensed signals. Further, the controller 114 wirelessly communicates with the computing device. Examples of the controller 114 includes but not limited to a microcontroller, a microprocessor, a DSP, ASIC etc.

The output unit 116 generates output signals upon receiving reminding signals from the controller 114. Example of output unit 116 includes but not limited to an audio unit for generating audio signals on receiving reminder signals from the controller 114, one or more light emitting sources connected to illuminate on receiving reminding signals from the controller 114, and a vibration unit to produce vibration signals on receiving reminding signals from the controller 114. Examples of light emitting sources include but not limited to LED, organic lighting and florescent effect; and examples of audio unit include but not limited to speakers, buzzer, piezoelectric buzzer etc.

The housing unit 118 is connected to the cap 104 for housing the printed circuit board 106, the first sensor 108, the battery 110, the battery holder 112, the controller 114, and the output unit 116. The housing unit 118 is configured according to the shape and size of the cap 102.

In another embodiment of the present invention, device 100 further includes a wireless communication unit 120 connected to the printed circuit board 106 for wirelessly communicating with the computing device. The computing device is explained in detail in conjunction with FIG. 2 of the present invention.

The wireless communication unit 120 may use various ways of the communication technologies such as wireless technology, near field communication, sonic/ultrasonic technology, or optical technology. Examples of the wireless technology include but not limited to Bluetooth, Bluetooth smart (BLE), Li-Fi, Wi-Fi, ANT, ZigBee, or any other proprietary communication protocol/frequency (band).

Examples of near field communication includes but not limited to magnetic NFC, Radio-frequency identification (RFID). Examples of the sonic/ultrasonic technology includes but not limited to communication over sound able or non-sound able frequency. Further the optical communication technology includes but not limited to visible (i.e. blinking the LED), Non Visible (i.e. IR LED).

In another embodiment of the present invention, the device 100 further includes a second sensor 122 to detect detaching and attaching of the cap 104 from the container 102 for generating a sensing signal for the controller 114. Examples of the second sensor 122 include but not limited to touch sensor, a gyro sensor, a vibration sensor, magnetic sensor, optical sensor, and an electro-mechanic sensor.

In an embodiment of the present invention, the usage of the second sensor 122 is to reduce the battery consumption. The second sensor 122 controls the operation profile of the first sensor 108. Preferably, the first sensor 108 measures the material level only after detection of attaching/detaching of the cap 104 by the second sensor 122.

Further, the second sensor 122 controls the operation of the wireless communication unit 120. The controller 114 sends the signal to the wireless communication unit 120 for sending the information to the computing device only on receiving sensing signals from the second sensor 122. The wave produced from the wireless communication unit 120 is thus decreases when controlled by the second sensor 122.

In another embodiment of the present invention, the device 100 further includes a third sensor 124 for measuring environmental conditions of the cap 104. Examples of third sensor 124 includes but not limited to a humidity sensor, temperature sensor, UV sensor, light sensor, accelerometer, gyro sensor, magnetic sensor, barometric sensors etc.

Figure 2:
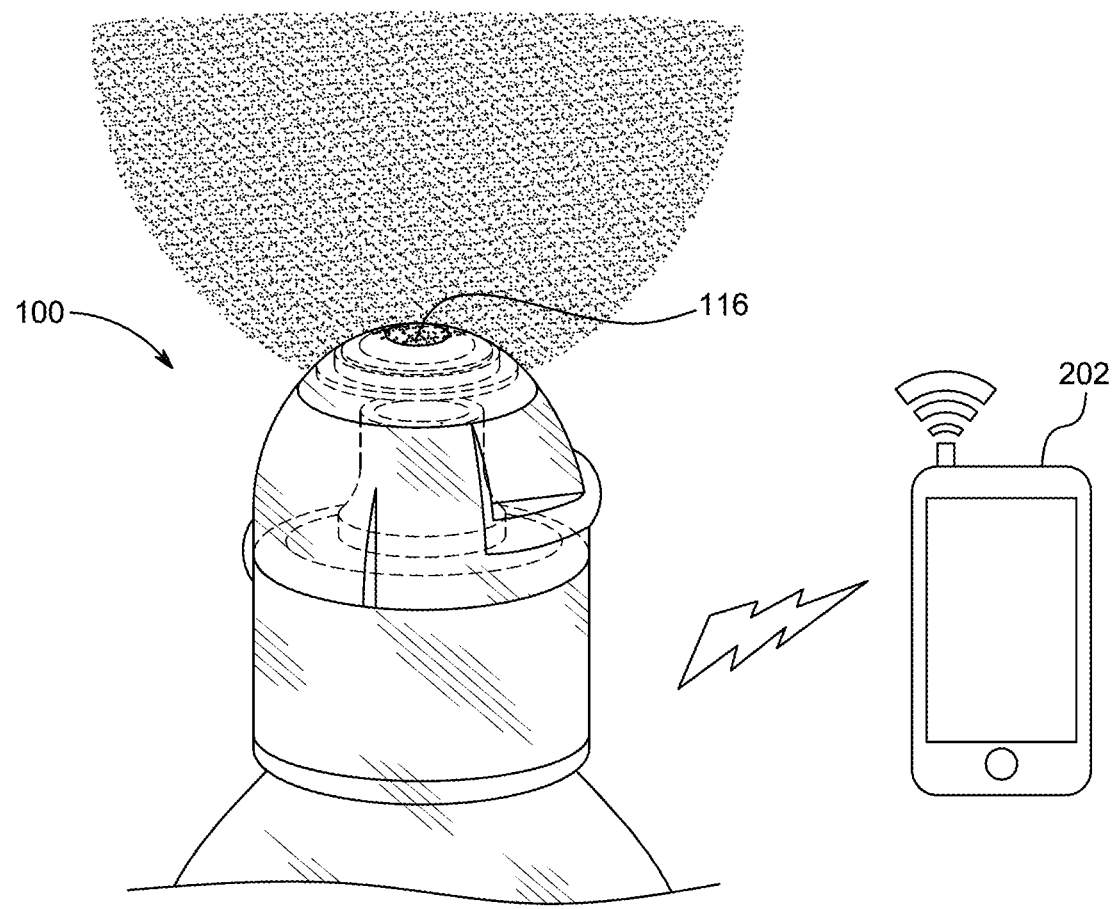
FIG. 2 illustrates a perspective view of a device in accordance with some embodiments of the present invention.

FIG. 2 illustrates a perspective view of the device 100 in accordance with some embodiments of the present invention. The output unit 116 is a LED and is illuminating to indicate a reminding signal for the user to drink from the container. The controller (not shown in FIG. 2) or the wireless communication unit (not shown in FIG. 2) communicates with a computing device 202.

Examples of the computing device 202 are include but not limited to mobile, smartphone, iPad, tablets, phablet, smart watch, computer, laptop, a handheld computer, a desktop, a display device or any other computing device capable of wirelessly interacting with our system.

In another embodiment of the present invention, the controller (not shown in FIG. 2) receives signal from the computing device 202 for generating reminding signals. For example, the computing device 202 generates a signal to illuminate LED, therefore the signal is send to the controller and thereafter, output unit 116 acts on the reminding signal from the controller to generate output signal i.e. illumination of LED.

Figure 3:
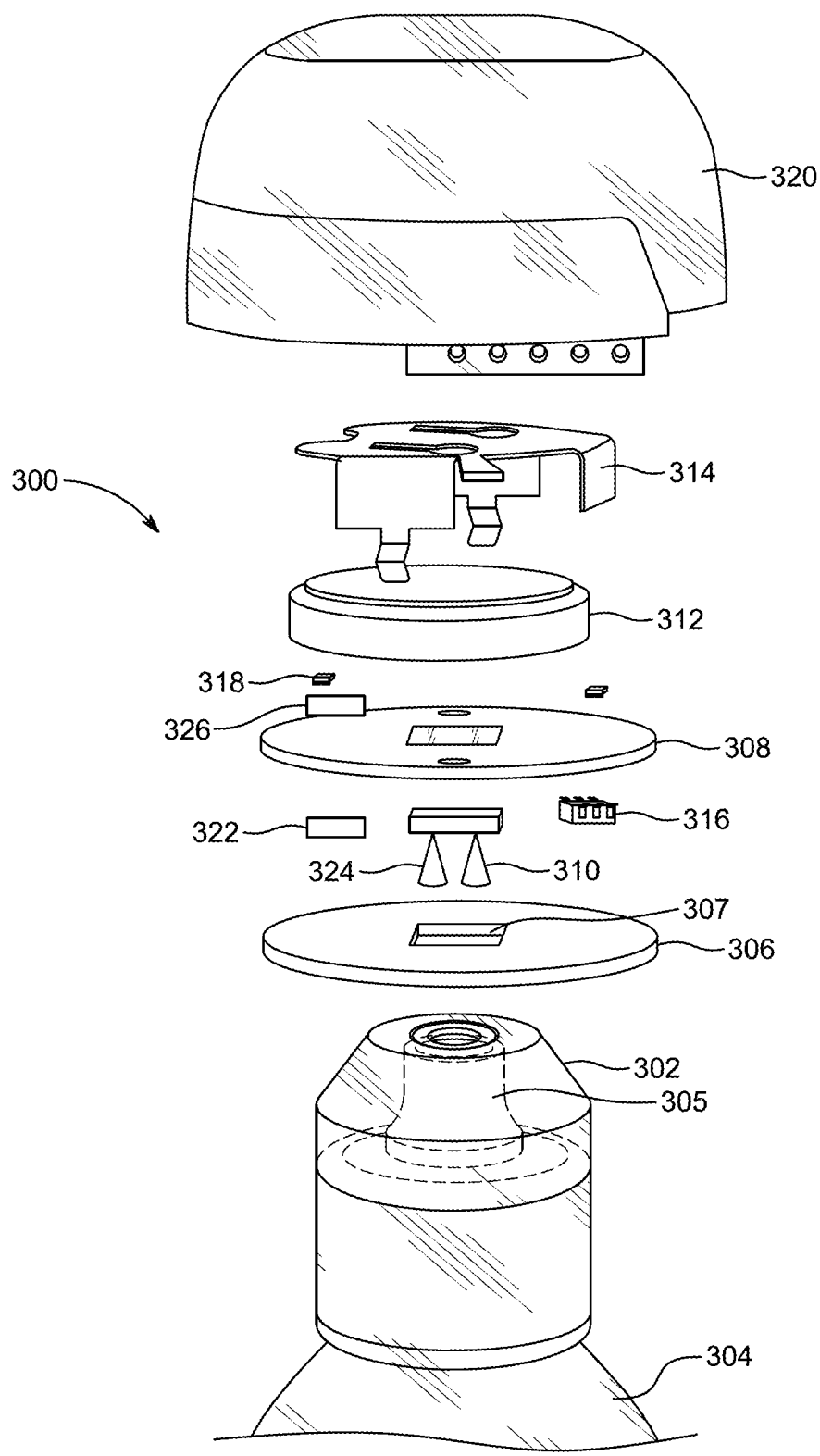
FIG. 3 illustrates an exploded view of a clip-on device clipped on a cap of a container in accordance with some embodiments of the present invention.

FIG. 3 illustrates an exploded view of a device 300 in accordance with some embodiments of the present invention. The device 300 may be clipped on to a cap 302 of a container 304 for measuring beverages level and communicating with a computing device. The container 302 includes a neck 305 for receiving material. In some embodiments, device 300 includes a housing unit 320 removably attachable to cap 302 of container 304 for holding a beverage. In some embodiments, housing unit 302 is configured to remain attached to cap 302 when the cap is at least partially removed from container 304. In some embodiments, housing unit 320 is further shaped to be fittable over cap 302 of the container 304, for example, to be snapped shut over the cap 304 of the container 302. In some embodiments, the controller 316 is configured to receive from the first sensor 310 an indication of a beverage level in the container 302 and activate the signal producing 318 unit based at least on the indication of the beverage level in the container.

In some embodiments, the device 300 may further include a signal producing unit 318 located in the housing unit 320, a first sensor 310 located in housing unit 320 to sense a beverage level in the container 304 and a controller 316 located in the housing unit 320. In some embodiments of the present invention, device 300 further includes a bottom cover 306, a printed circuit board 308, a battery 312 and a battery holder 314.

In some embodiments, bottom cover 306 is attached to the housing unit 320, wherein the signal producing unit 318, the first sensor 310 and the controller 316 are placed between the housing unit 320 and the bottom cover 306. The bottom cover 306 may include an indent portion 307 to be placed on the cap 302 of the container 304. The indent 307 may be aligned parallel to the nozzle 305 (e.g., a spout), when the housing unit is closed over the cap of the container. The printed circuit board 308 may be placed on the bottom cover 306. In some embodiments, the first sensor 310 is disposed in the indent 307 of the bottom cover 306 and further connected to the printed circuit board 308. In some embodiments, at least the controller 316 and the signal producing unit 318 are mounted on the printed circuit board.

In some embodiments, first sensor 310 measures the beverage level inside the container 304 and generates sensing signal based on the material level. In some embodiments, the first sensor 310 measures the material level through the nozzle of the 305 of the container. In some embodiments, the neck nozzle has an opening. In some embodiments, the nozzle is closed (for liquid flow) when the cup 304 closes container 306 and first sensor 310 is configured to measure the beverage level using methods that can penetrate a closed nozzle, for example, using infrared (IR) radiation, ultrasonic vibrations etc. In some embodiments, the first sensor 310 is selected from the group consisting of: an optical sensor, a capacitive sensor, and an ultrasonic sensor.

In some embodiments, the battery 312 is placed on the printed circuit board 308, the battery holder 314 is for holding the battery 312 on the printed circuit board 308, and the controller 316 is connected to the printed circuit board 308 for generating reminding signals based on the analysis of the sensed signals. In some embodiments, the device further includes communication unit 322 associated with the controller 316. The controller 316 may further be configured to communicate with a user device via the communication unit 322.

In some embodiments, the signal producing unit 318 generates the output signals upon receiving reminding signals from the controller 316. Examples of the output unit 318 include but not limited to an audio unit for generating audio signals, one or more light emitting sources (such as LED) for illuminating, and a vibration unit to produce vibration signals.

In some embodiments, the housing unit 320 may be clipped on the cap 302 of the container 304 for housing the bottom cover 306, the printed circuit board 308, the first sensor 310, the battery 312, the battery holder 314, the controller 316 and the output unit 318. The housing unit 320 may be designed according to the shape and the size of the cap 302 of the container 304. The housing unit 320 may further include a cap receiving area for receiving the cap 302 of the container 304. The cap receiving area is shown and explain in FIG. 4 of the present invention.

In some embodiments, the communication unit 322 includes a wireless communication unit connected to the printed circuit board 308 for wirelessly communicating with the user device. In some embodiments, the device 300 includes a second sensor 324 to detect detaching and attaching of the cap 302 from the container 304. The second sensor 324 may release sensing signal for the controller 316.

Examples of the first sensor 310 includes an optical sensor, a capacitive sensor and an ultrasonic sensor; and examples of the second sensor 324 includes but not limited to a touch sensor, a gyro sensor, a vibration sensor, a magnetic sensor, an optical sensor, and an electro-mechanic sensor. The examples of the wireless communication unit 322 are similar to the wireless communication unit 120 of the FIG. 1 of the present invention.

In some embodiments of the present invention, the device 300 further includes a third sensor 326 for measuring environmental conditions of the housing unit 320. Examples of third sensor 326 includes but not limited to a humidity sensor, temperature sensor, UV sensor, light sensor, accelerometer, gyro sensor, magnetic sensor, barometric sensors etc. in some embodiments, the controller 316 is further configured to receive from the third sensor 326 an indication of an environmental condition and to change the activation of the signal producing unit 318 based at least on the indication of the environmental condition.

Figure 4:
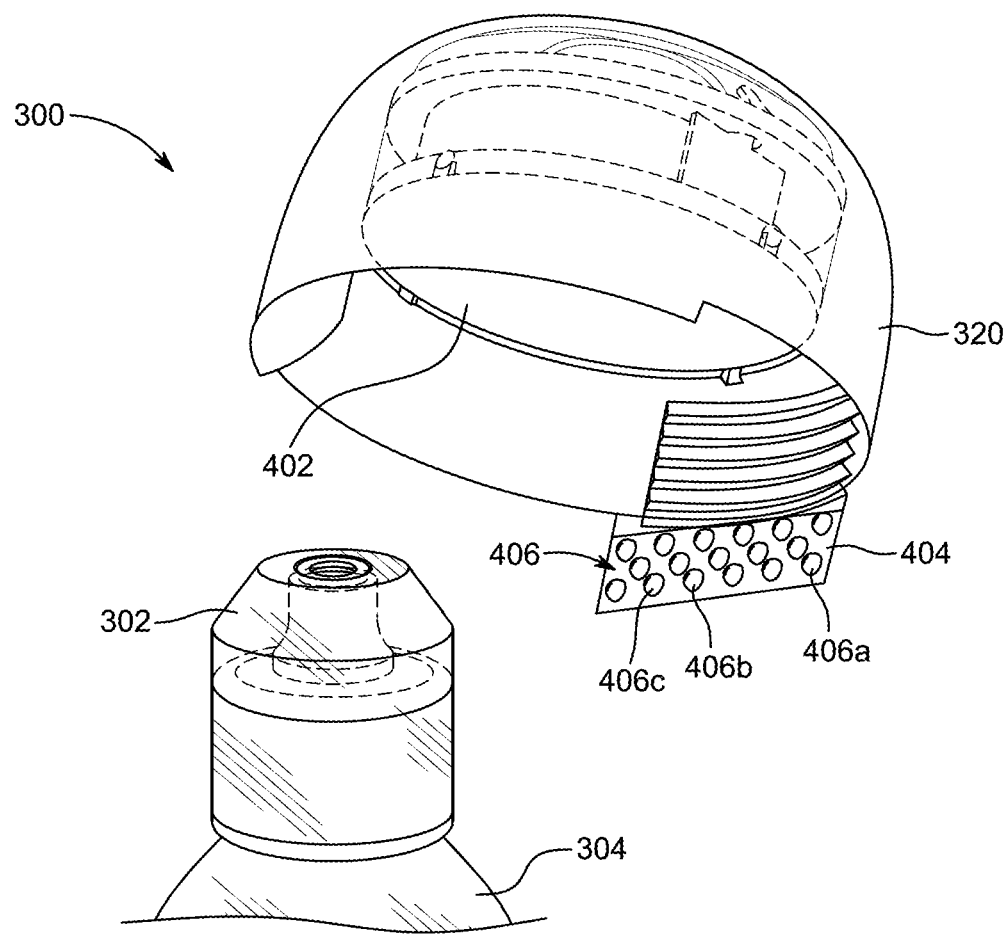
FIG. 4 illustrates a perspective view of the clip-on device detachably attached to the container in accordance with some embodiments of the present invention.

FIG. 4 illustrates a perspective view of the device 300 in accordance with some embodiments of the present invention. The device 300 may include a cap receiving area 402 for receiving the cap 302 of the container 304. The device 300 may include a plate 404 extending downwards from the housing unit 320 towards the cap 302 and plurality of bumpers 406 such as 406a, 406b and 406c configured on the plate 404 to fasten the housing unit 320 over the cap 302.

The present invention offers various advantages such as the amount of material being used by the user. For example, the amount of beverage consumed by the user in whole day, reminding the user to drink the beverage based on the sensing of the material level inside the container. Like, if the user has drunk only 2 L since morning, then reminding the user to drink more beverage at regular interval of times. The present invention further helps in measuring powder (such as coffee, nutrient supplements) content inside a container.

The invention claimed is:

1. A device for measuring material level inside a container, the container comprising a neck and an opening at a top of the container for receiving and dispensing material, and a cap configured to close the opening of the container and comprising an indent into the container aligned parallel to the neck of the container, the device comprising:
    a housing unit configured to be attached to the cap, such that said housing unit is located above the opening of the container when the cap is closed, said housing unit enclosing:
        a first sensor for measuring the material level inside the container;
        a printed circuit board, wherein said first sensor is situated between the printed circuit board and the indent;
        a battery;
        a battery holder for holding the battery on the printed circuit board; and
        a controller connected to the printed circuit board for:
            receiving a signal from the first sensor related to the material level in the container;
            calculating an amount of material in the container based on the received signal; and
            issuing reminding signals based on the calculated amount; and
        an output unit for releasing output signals upon receiving the reminding signals from the controller,
    wherein the housing unit is configured such that, when the cap is fitted onto the container, the printed circuit board, the first sensor, the battery, the battery holder and the controller are located above the opening of the container, and
    wherein, when the housing unit is attached onto the cap, the device measures the material inside the container, calculates the amount of material in the container and issues reminding signals.

2. The device according to claim 1, wherein the first sensor comprising at least one of: an optical sensor; capacitive sensor; and ultrasonic sensor.

3. The device according to claim 1, wherein the output unit comprising at least one of:
    an audio unit connected to the printed circuit board to generate audio signals on receiving reminder signals from the controller;
    one or more light emitting sources connected to the printed circuit board to illuminate on receiving reminder signals from the controller; and
    a vibration unit connected to the printed circuit board to produce vibration signals on receiving reminder signals from the controller.

4. The device according to claim 1, further comprising a wireless communication unit connected to the printed circuit board for wirelessly communicating with the computing device on receiving signal from the controller.

5. The device according to claim 1, further comprising a second sensor to detect detaching and attaching of the cap from the container for generating sensing signal for the controller, wherein the controller controls an operation of the first sensor only after a detection of attaching or detaching of the cap sensed by the second sensor.

6. The device according to claim 1, further comprising a third sensor for measuring environmental conditions of the cap and wherein the controller is configured to generate the reminding signals also based on an analysis of environmental conditions.

7. The device according to claim 1, further comprising:
    a plate extending downwards from the housing unit towards the cap; and
    a plurality of bumpers configured on the plate to fasten the housing unit over the cap.

8. The device of claim 1, further comprising:
    a communication unit in communication with the controller for communicating wirelessly with an external computing device, the communication unit is enclosed in the housing unit.

9. The device of claim 1, wherein said housing unit, when attached into the cap of the container, is configured not to allow material inside the container to pass therethrough.

* * * * *